United States Patent [19]

Espelage et al.

[11] Patent Number: 4,562,396

[45] Date of Patent: Dec. 31, 1985

[54] PHASE-LOCKED LOOP CONTROL OF AN INDUCTION MOTOR DRIVE

[75] Inventors: Paul M. Espelage, Salem, Va.; David L. Lippitt, Scotia, N.Y.

[73] Assignee: General Electric Company, Salem, Va.

[21] Appl. No.: 626,999

[22] Filed: Jul. 2, 1984

[51] Int. Cl.⁴ ............................................. H02P 5/40
[52] U.S. Cl. .............................. 318/809; 318/345 E
[58] Field of Search .................... 318/803, 807–811, 318/345 R, 345 E

[56] References Cited

U.S. PATENT DOCUMENTS

| | | | |
|---|---|---|---|
| 4,063,146 | 12/1977 | Oliver | 318/345 R |
| 4,312,031 | 1/1982 | Kudor | 318/811 |
| 4,399,395 | 8/1983 | Espelage | 318/803 |
| 4,427,933 | 1/1984 | Wagener et al. | 318/345 E |
| 4,449,087 | 5/1984 | Lippitt et al. | 318/723 |

Primary Examiner—David Smith, Jr.
Attorney, Agent, or Firm—Arnold E. Renner

[57] ABSTRACT

A controlled current inverter (CCI) induction motor drive is controlled by controlling motor current and the angle between motor flux and motor current. The angle between motor flux and current is derived directly via a microcomputer phase-locked loop synchronized to the integrated motor voltage. The delay between the application of a firing signal to a thyristor and the initiation of line current is determined and compensated for to achieve the desired angle between motor flux and motor current.

11 Claims, 7 Drawing Figures

Microfiche Appendix Included
(1 Microfiche, 14 Pages)

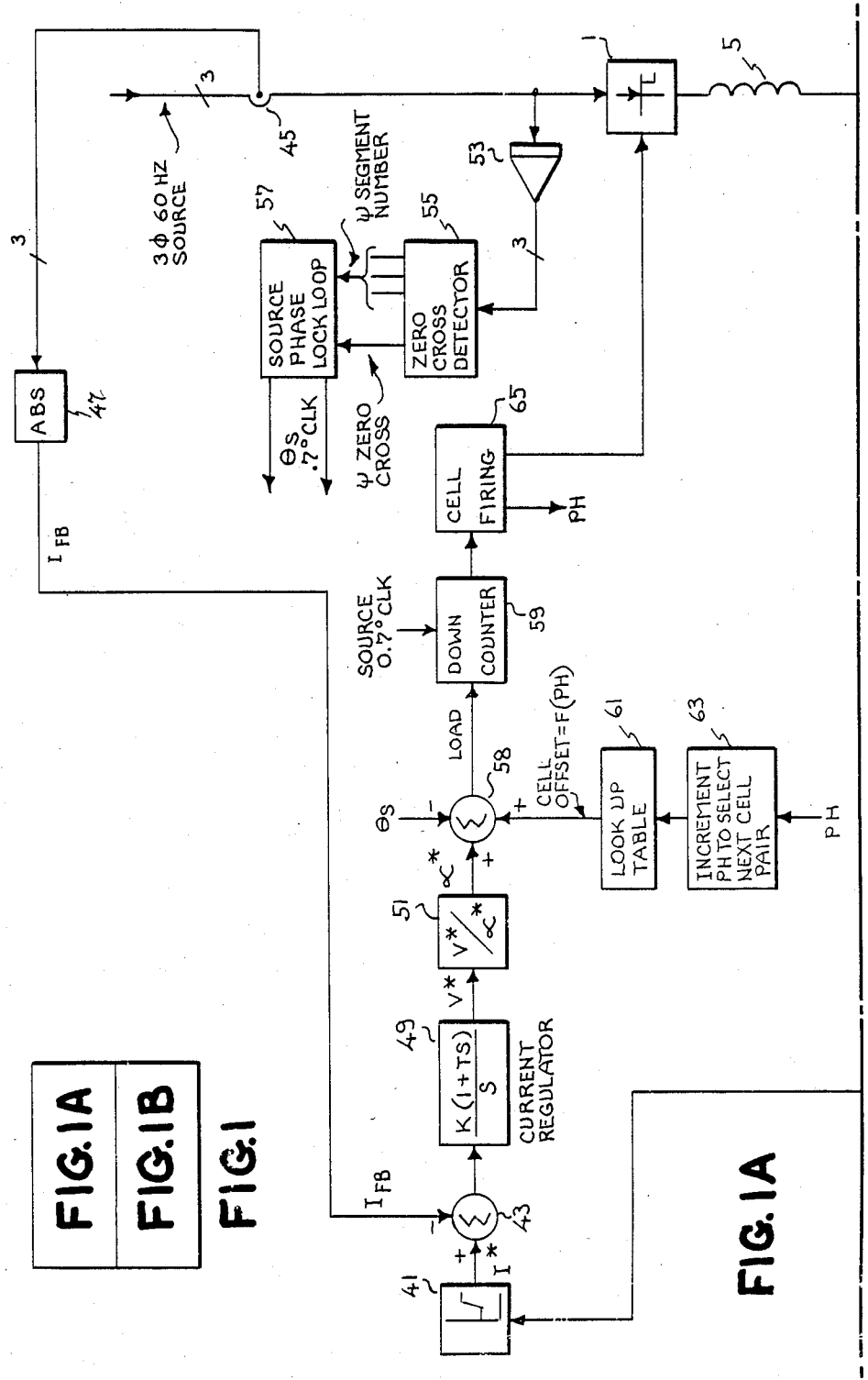

FROM FIG.3A

```
THE DIFFERENCE BETWEEN ACTUAL CURRENT ZERO CROSSING
AND THE INTENDED ZERO CROSSING IS DETERMINED BY
DIFF = I CROSS$TIME$ARRAY (ACT$PH) - UNCOR$TIME$TO$
FIRE$ARRAY (ACT$PH) CORRECT THIS VALUE OF DIFF FOR
NUMERIC WRAP AROUND AND CALL THE RESULT DELTA$
DELAY$ANGLE
```

```
THE VALUE DETA$DELAY$ANG IS INPUT TO A SOFTWARE
INTEGRATOR TO OBTAIN DELAY$ANG = DELAY$ANG +
DELTA$DELAY$ANG THE VALUE OF DELAY$ANG IS
CLAMPED BETWEEN 0° AND 120°
```

```
CALCULATE TIME$TO$FIRE = UNCOR$TIME$TO$FIRE -
DELAY$ANGLE
```

CALCULATE TIME$TO$GO. THIS IS THE VALUE IN DEGREES TO BE LOADED INTO A DOWN COUNTER, SUCH THAT WHEN THE DOWN COUNTER CLOCKS DOWN TO ZERO COUNT, AN INTERRUPT IS GENERATED WHICH CALLS FOR THE NEXT CELL FIRING. TIME$TO$GO = TIME$TO$ FIRE - TIME$COUNTER READING. REMEMBER TIME COUNTER IS A RAMP FROM 0 TO 512 COUNTS OR $\frac{360}{512} = .703°/\text{COUNT}$

TIME$TO$GO IS CORRECTED FOR NUMERIC WRAP AROUND

IF ALREADY TOO LATE, FIRE NEXT CELL PAIR IMMEDIATELY

COMPARE TIME$TO$GO WITH THE TIME IT TAKES TO RUN ANOTHER REGULATOR CALCULATION. IF THERE IS NOT ENOUGH TIME TO RUN ANOTHER CALCULATION, THEN LOAD FIRE COUNTER WITH THE TIME TO GO. THEN LOAD THE FIRE COUNTER PRESET WITH 60° OF COUNT SUCH THAT IF FOR SOME REASON THE NEXT REGULATOR CALCULATION IS NOT COMPLETED IN TIME FOR THE NEXT FIRING, THEN THE NEXT FIRING WILL DEFAULT TO FIRING 60° LATER.

IF THE TIME$TO$GO IS GREATER THAN THE TIME TO RUN ANOTHE REGULATOR CALCULATION, THEN LOAD THE FIRE COUNTER WITH SOME VALUE (NEXT$TIME) AND LOAD THE FIRE COUNTER PRESET WITH A VALUE (TIME$TO$GO - NEXT $TIME). WHEN NEXT$TIME TIMES OUT ANOTHER REGULATOR CALCULATION WILL BE MADE AND THE FIRE COUNTER WILL BE LOADED WITH THE PRESET, SUCH THAT IF THE NEW REGULATOR CALCULATION IS NOT READY THE NEXT CELL FIRING WILL DEFAULT TO (TIME$TO$GO - NEXT$TIME)

RETURN TO "WAIT FOR INTERRUPT FROM FIRE$ COUNTER"

FIG.3B

PHASE-LOCKED LOOP CONTROL OF AN INDUCTION MOTOR DRIVE

REFERENCED MATERIAL

Reference is made to a microfiche appendix which sets forth a computer program listing of the software modules which have been modified in the program listing provided in the microfiche appendix of D. Lippitt et al. U.S. Pat. No. 4,449,087. Included with this application is one microfiche containing a total of 14 frames. U.S. Pat. No. 4,449,087 is assigned to the same assignee as the instant application and is hereby incorporated by reference.

CROSS REFERENCE TO RELATED APPLICATIONS

This application is related to copending application Ser. No. 627,000, filed July 2, 1984, and Ser. No. 626,982 filed on even date herewith and assigned to the instant assignee.

BACKGROUND OF THE INVENTION

The present invention relates to a controlled current inverter induction motor drive and more particularly to a controlled current inverter induction motor drive that controls motor current and the angle between motor flux and motor current.

Previous current controlled inverter induction motor drives, such as the one shown in Espelage et al. U.S. Pat. No. 4,230,979, filed Apr. 10, 1978 and assigned to the same assignee as the present invention, use a control based on DC-link current and the angle between motor flux and motor current. The motor current to flux angle is determined indirectly by calculating the sine of the motor current/flux angle using two squaring circuits, one square root circuit, three multiplier circuits and a divider circuit which makes the analog implementation complex and costly. The calculated $\sin \theta$ is used as a feedback signal to compare to a commanded $\sin \theta$ angle. Furthermore, the load thyristor firing is controlled by the output of a load angle regulator ($\sin \theta$) supplying a voltage controlled oscillator which then supplies a six stage ring counter, which in combination with additional logic, sequentially gates load inverter thyristors.

It is an object of the present invention to control the motor current/flux angle in an induction motor drive in a direct manner simplifying the implementation without sacrificing performance.

It is a further object of the present invention to control an induction motor drive by controlling motor current and the angle between motor flux and motor current where this angle is derived directly from a phase-locked loop synchronized to integrated motor voltage.

SUMMARY OF THE INVENTION

In one aspect of the present invention a control for an induction motor drive is provided having a controlled current inverter with a plurality of controllable switches. The inverter provides variable frequency, variable magnitude current to the motor. Comparator means, responsive to a commanded speed signal and a speed feedback signal, provide a speed error signal. The speed error signal is used to determine an inverter firing angle signal. The zero crossings of motor flux signals are determined and used to provide a pulse signal at a predetermined multiple of the fundamental motor frequency. A phase-locked loop counter is synchronized to the pulse signal and provides a predetermined number of counts per fundamental period to clock a down counter. The down counter is loaded with the time to go, to fire the next controllable switch when the down counter times out. The time to go is determined from the firing angle. Current conduction in the controllable switches in the inverter is detected and the delay in current conduction after the application of the firing signal to that switch is determined. The time loaded in the down counter is compensated to take into account the delay so as to fire the controllable switch at an earlier time to achieve line current conduction at the instant determined by the inverter firing angle signal.

BRIEF DESCRIPTION OF THE DRAWING

The features of the invention believed to be novel are set forth with particularity in the appended claims. The invention itself, both as to organization and method of operation, together with further objects and advantages thereof, may best be understood by reference to the following description taken in conjunction with the accompanying drawing in which:

FIGS. 3A and 3B is a flow chart illustrative of the software for implementing the load side converter control with the embodiment of FIG. 2.

DETAILED DESCRIPTION OF THE INVENTION

Figure 1B:
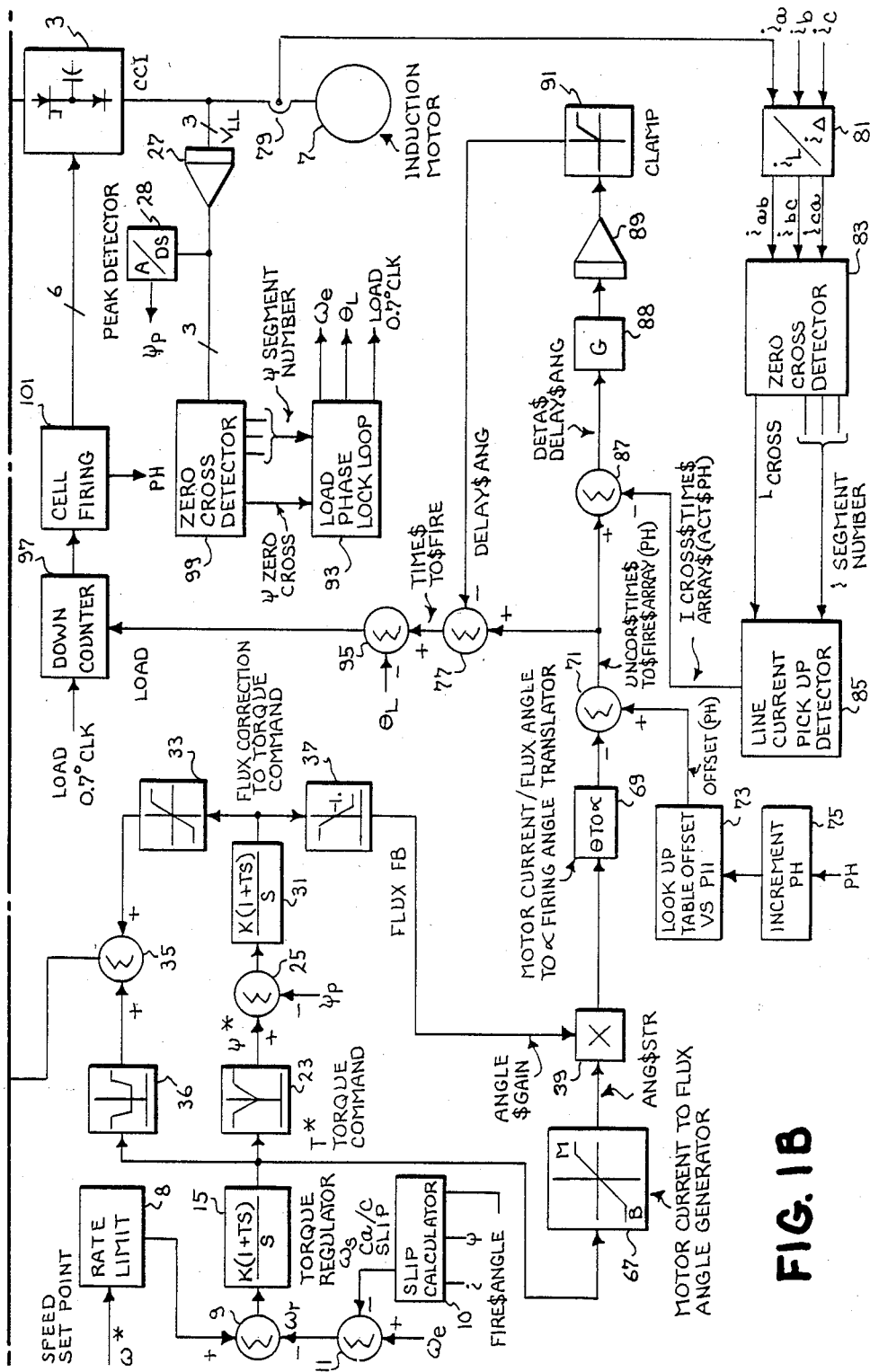
FIG. 1, including 1A and 1B, is a major block diagram representation of a drive system incorporating the present invention.

Referring now to the drawing and particularly FIG. 1 thereof, an induction motor drive system including a source side converter comprising a phase controlled rectifier 1, is coupled to an external 3 phase power source. The source side converter provides variable magnitude direct current to a load side converter comprising a current controlled autosequentially commutated inverter 3 through a DC-link reactor 5. The inverter operates to provide variable magnitude, variable frequency AC current to a 3 phase induction motor 7.

A commanded speed $\omega^*$ is an input signal to the AC motor drive control and is supplied to a rate limiting block 8 and the output of the rate limiting block is compared to a speed feedback signal $\omega_r$ in summer 9. The speed feedback signal $\omega_r$ is developed by calculating the slip in a slip calculator 10 from motor current, flux and firing angle, and subtracting the slip in summing junction 11 from the frequency $\omega_e$ of the power supplied to the induction machine 7. The error signal from summing junction 9 is supplied to a speed regulator circuit 15 having a transfer function of $$K(1+TS/S)$$

where s is the LaPlace operator. The output of the speed regulator block is a torque command $T^*$. The torque command is fed to three control paths. An upper path controls the current in the phase controlled rectifier 1.

A center control path controls flux in the induction motor 7 by controlling the firing of the switching devices in inverter 3. The center path provides flux correction to the torque command T* provided to the upper and lower paths. Function block 23 converts the torque reference signal T* to a flux command $\psi^*$. The function implemented in function block 23 provides an offset to assure a fixed level of flux at zero torque. The flux command is compared in summing junction 25 to a flux signal $\psi_p$, determined by integrating motor line voltages in integrator 27 and passing the signal through a peak detector 28, to form a flux feedback signal. The result of this comparison is fed through a gain block 31 to a limiter 33. The output of the limiter is supplied to a summing junction 35 along with the magnitude of the torque command signal, the output from block 36. The output from limiter 33 adjusts current command when the flux is different from the commanded value, to convert the upper current control path to a flux regulator when torque and commanded torque are both near zero.

The flux error signal from gain block 31 is also supplied to an offset function in block 37. The output of block 37 is coupled to a multiplier 39 in the lower control path. Offset function 37 generates an output of unity when the flux error signal is zero. The output of the offset function 37 decreases below unity when the commanded flux is greater than the actual flux to decrease the angle between motor current and flux to divert more of the available current into the flux producing axis.

The flux corrected torque signal from summing junction 35 is supplied to a function block 41 which provides a current command I* which is compared to a current feedback signal $I_{FB}$ in summing junction 43. The current feedback signal is obtained from current sensors 45 in each of the three lines supplying the phase controlled rectifier 1. Absolute value block 47 receives the three sensed line currents and provides the current feedback signal $I_{FB}$ indicative of the magnitude of the three signals.

Current regulator 49, which can be a proportional plus integral regulator, in response to the current error from summing junction 45, provides a voltage command signal V*. A voltage to firing angle transistor 51, which can be implemented as a look-up table, provides a firing angle command $\alpha^*$ in response to the voltage command V*.

A firing circuit, including a phase-locked loop integrator, zero crossing detector, cell firing block, and down counter for the phase controlled thyristor bridge is the same as set-forth in the aforementioned Lippitt et al. U.S. Pat. No. 4,449,087. The three phase line to line voltages supplied to the phase controlled thyristor bridge are integrated in integrator 53 and the zero crossings of the integrated voltages are determined in block 55 and used to form a synchronizing pulse train to the phase-locked loop 57 having a frequency of 6 times the source fundamental frequency $\omega_s$. A preferred form of apparatus utilizable for implementing the integration of the line to line voltages comprises circuitry shown and described in U.S. Pat. No. 4,399,395 issued Aug. 16, 1983 entitled "Line-to-Line Voltage Reconstruction for Synchronizing Thyristor Power Converter", which is hereby incorporated by reference. Such circuitry operates to reconstruct the line to line voltage waveforms which become corrupted by the commutation notches appearing in the waveforms of the phase voltages during the time each phase current transfers from an outgoing phase to an oncoming phase by the appropriate firing of the individual thyristors. The line to line voltage reconstruction preferred by the subject invention consists of a composite waveform developed by summing at least one integrated line to line voltage containing commutation notches with a signal corresponding to at least one "delta" current which is derived from the difference of two phase currents and multiplied by a factor representative of the commutation inductance.

At the occurrence of a zero crossing signal, a time counter in the phase-locked loop 57 is read. The correct time counter reading at this instant is known, and the difference between the actual and correct values represents a phase error which passes through a software proportional plus integral regulator. The output of the regulator represents the value by which the high frequency clock to the phase-locked loop counter is divided so as to provide a clock frequency from the phase-locked loop counter of 512 times the fundamental frequency of the line to line voltage supplied the phase controlled thyristor bridge 1. The frequency of 512 times the fundamental frequency provides an angle resolution of 0.703° of fundamental frequency and serves as the clock frequency to the down counter 59. The commanded firing angle $\alpha^*$ is added to a cell offset from a look-up table 61. The table look-up provides one of six offsets based on the variable PH which is indicative of the next cell pair to be fired. The variable PH is incremented each time a cell is fired.

The term cell is used in this application to refer to the controllable switches in the converters, namely, thyristors. The variable PH which can take on the values of one through six inclusive is indicative of which cell pair is to be fired next as, shown in the table below.

| PH | ON CELLS |
| --- | --- |
| 1 | 6 and 1 |
| 2 | 1 and 2 |
| 3 | 2 and 3 |
| 4 | 3 and 4 |
| 5 | 4 and 5 |
| 6 | 5 and 6 |

The cells in the bridge of the converters 1 and 3 are numbered, as shown below, in the order in which they are fired

| 1 | 3 | 5 |
| --- | --- | --- |
| 4 | 6 | 2 |

The A phase is connected between cells 1 and 4, the B phase is connected between cells 3 and 6 and the C phase is connected between cells 5 and 2. Each variable PH has a duration of 60° and each cell is fired with a high frequency pulse train 120°.

The current count of the time counter located in the source phase-locked loop 57 is substracted from the other inputs summing junction 58 and the resultant amount loaded into down counter 59. When down counter 59 reaches zero a signal is sent to the cell firing block 65 which fires the appropriate thyristor pair in phase controlled rectifier 1 and sends a signal to increment the variable PH in block 63.

The motor current to flux angle generator 67 in the lower control loop receives a torque command T* and provides a desired angle between motor current and motor flux angle. The motor current/flux angle signal is modified by multiplier 39 as a function of a flux feedback signal from gain block 37. The resulting motor current to flux angle is converted to an equivalent firing angle α in motor current flux angle to alpha firing angle translator 69. The firing angle α is added in summer 71 to an offset determined from a look up table 73 which contains six offsets, one for each variable PH value indicative of the next cell pair to be fired. The output of summer 71 is the uncorrected time to fire array, which corresponds to the time in degrees to fire the next pair of load side cells in the autosequentially commutated inverter 3.

In summer 77 a delay angle in degrees is subtracted from the uncorrected time to fire the array to compensate for the delay in line current pick up when the thyristor it is fired due to the controlled current commutating circuit. The delay angle is determined by measuring the three line currents $i_a$, $i_b$, $i_c$ using current sensors 79. The difference currents $i_{ab}$, $i_{bc}$, $i_{ca}$ are next determined in a line to delta transformation block 81. A zero crossing detector 83 generates a digital signal when a zero crossing of the difference currents occurs and a three bit segment number indicative of the difference current having the zero crossing. These two sets of signals from the zero crossing detector are provided to a line current pick up detector 85 which determines which thyristor firing is associated with the last zero crossing and the time of the current pick up. The difference between the actual current zero crossing and the intended zero crossing is determined in summer 87, and the resulting error angle is input through a gain block 88 to an integrator 89. The output of the integrator is clamped in limiter circuit 91 with lower and upper limits of zero and 120°, respectively. The time to fire signal from summer 77 is reduced by the current count $\theta_L$ of a phase-locked loop 93 in summer 95, to determine the time to go. The time to go is loaded into a down counter 97 which is clocked by a clock signal from the phase-locked loop 93. When the down counter 97 times out the cell firing block 101 fires the next pair of cells in inverter 3. Integrator 27, zero crossing detector 99, cell firing circuit 101 and down counter 97 operate in the same manner as the corresponding firing circuitry described in the upper control loop.

Figure 2:
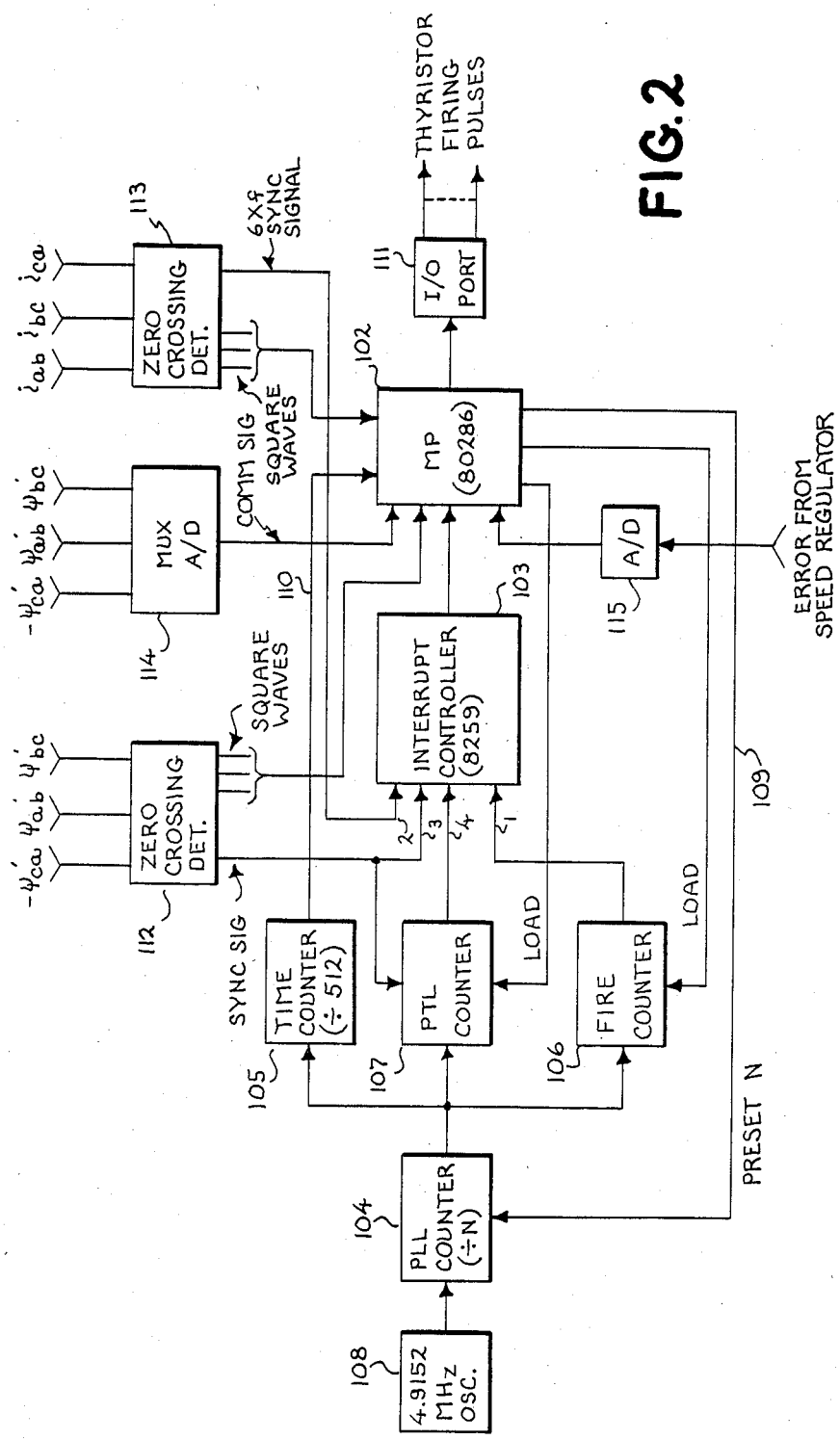
FIG. 2 is a hardware diagram of a digital embodiment of the load side converter control of the drive system of FIG. 1.

A digital implementation of the portion of the block diagram of FIG. 1 responsive to the speed error signal from summer 9 for controlling the firing of inverter 3 is shown in FIG. 2. Referring now to FIG. 2, there is shown an INTEL 80286 microprocessor 102 programmed in the PLM 86 language, having self contained interrupt programs under the control of an INTEL 8259 interrupt controller 103. The controller 103 generates interrupts in a well known fashion which causes the microprocessor 102 to execute some task or calculation and typically store the time to execute some future event into a down counter. When the down counter reaches zero, the counter generates another interrupt which initiates the event, after which the counter is reloaded for the time to execute the next event.

With respect to FIG. 2, a software phase-locked loop configuration is shown wherein four counters are utilized, namely a phase-locked loop counter 104, a time counter 105, a fire counter 106 and a pulse train limit counter 107. In operation, a variable frequency source is created by the phase-locked loop counter 104 by dividing a 4.9152 MHz output pulse train from a clock oscillator 108 by a value N set by a signal "PRESET N" from the microprocessor 102 on a data bus 109. The output of the counter 104 is adapted to be maintained at a frequency 512 times the frequency of the individual flux waves $\psi_{ca}'$, $\psi_{ab}'$, $\psi_{bc}'$, in the following manner.

The time counter 105 is initially set to 512 at a particular flux wave crossover and decremented by 1 each clock pulse from counter 104. When counter 105 is decremented to one it resets to 512. Thus counter 105 gives a measure of phase angle relative to the flux waveforms. The count value in the time counter 105 is fed to the microprocessor 102 via data bus 110 where it is used for phase reference for firing the inverter cell, not shown, through a digital I/O port 111. Synchronization is achieved by passing the pseudo flux wave forms $\psi_{ca}'$, $\psi_{ab}'$, $\psi_{bc}'$ through a zero crossing detector 112 which generates a synchronizing pulse every time a flux wave passes through zero. These pulses are fed to the interrupt controller 103 which interrupts the microprocessor 102 and initiates a crossover service program. The zero crossing detector 112 also generates a three bit number indicating the relative signs of the motor flux waveforms, which number is fed to and read by the microprocessor 102 and is used to identify which zero crossing has caused the interrupt pulse. The zero crossover service program reads the value in the time counter 105 and compares it to the correct value for the particular flux wave crossing to generate a phase error between the counter 105 and the flux waves. This error is used to calculate a new "PRESET N" value which is then loaded into the phase-locked loop counter 104.

Figure 4:
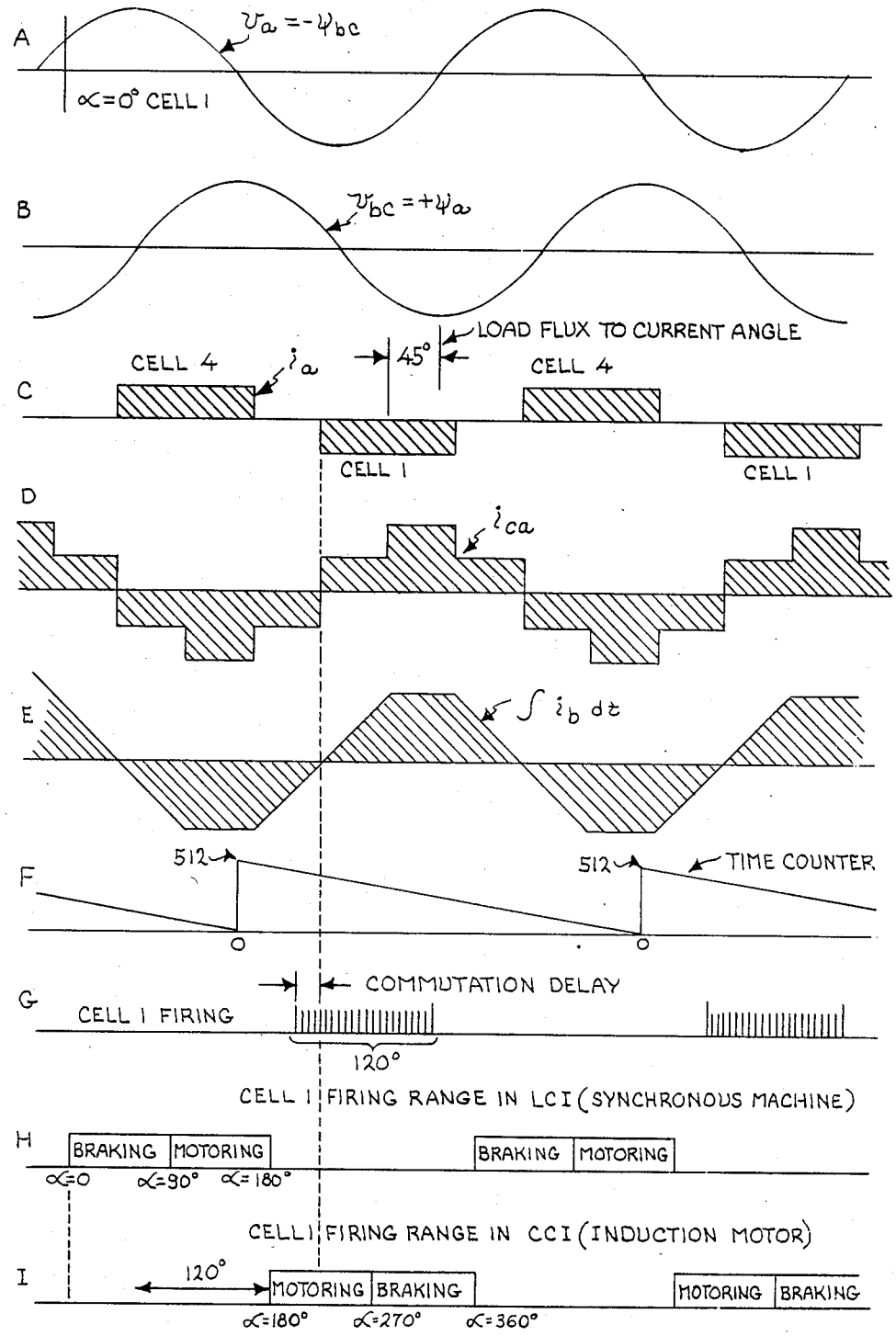
FIGS. 4A–I are waveform and firing range diagrams on a common time scale helpful in explaining the operation of the present invention.

There can be a substantial delay between the application of a firing signal to a thyristor and the time when line current starts to conduct in a controlled current inverter supplying an induction motor, especially at high motor speed and light motor load. This delay is caused by the fact that the commutating capacitors are charged such that initially the particular diode in series with the thyristor being fired is reversed biased and the current doesn't pick up in that phase until the commutation capacitor has discharged through the load. To preserve the desired relationship between motor flux and current, this delay has to be compensated for. The time at which the current actually picks up is measured by zero crossing detector 113 monitoring the zero crossings of the motor line difference currents to generate an interrupt signal to the interrupt controller 103 every time a zero crossing is detected. The difference current $i_{ca}$ is shown in FIG. 4D. The zero crossing of FIG. 4D coincides with the initiation of current flow in Phase A shown in FIG. 4C. The interrupt controller interrupts microprocessor 102 and initiates a delay determination program. The zero crossing detector 113 also generates a three bit number indicating the relative signs of the motor difference currents, which number is fed to and read by microprocessor 102 and is used to identify which thyristor is associated with a zero crossing. The delay determination program compares the current crossing time and the uncorrected time to fire (based on the angle command and offset) and inputs this value through a gain to a software integrator to obtain the delay angle. The delay angle is clamped between zero and 120°. Also since the commutation delay is a constant time phenomenon, the need to compensate for the delay decreases as a function of speed. Therefore, since the sampling rate of the compensator occurs at six times load frequency, the gain of the regulator loop track frequency inherently stabilizes the compensator.

The time to fire is then determined as the uncorrected time to fire less the delay angle. The time to go is determined by subtracting the time counter reading from the time to fire so that when the time to go, which is measured in degrees, is loaded into the down counter and the down counter clocks down to zero count, an interrupt is generated which calls for the next cell firing.

The timing of the firing of each thyristor cell in the inverter 3 is accomplished by means of the fire counter 106. After a cell firing, the microprocessor 102 computes the time to fire the next cell. This time is the uncorrected time to fire less the delay angle. This time is compared to the value in the counter 105 which corresponds to current time. The difference is the time to go which is then loaded into the fire counter 106 via the data bus, which then decrements to zero causing yet another interrupt through the interrupt controller 103 which initiates a cell firing program.

Figure 3A:
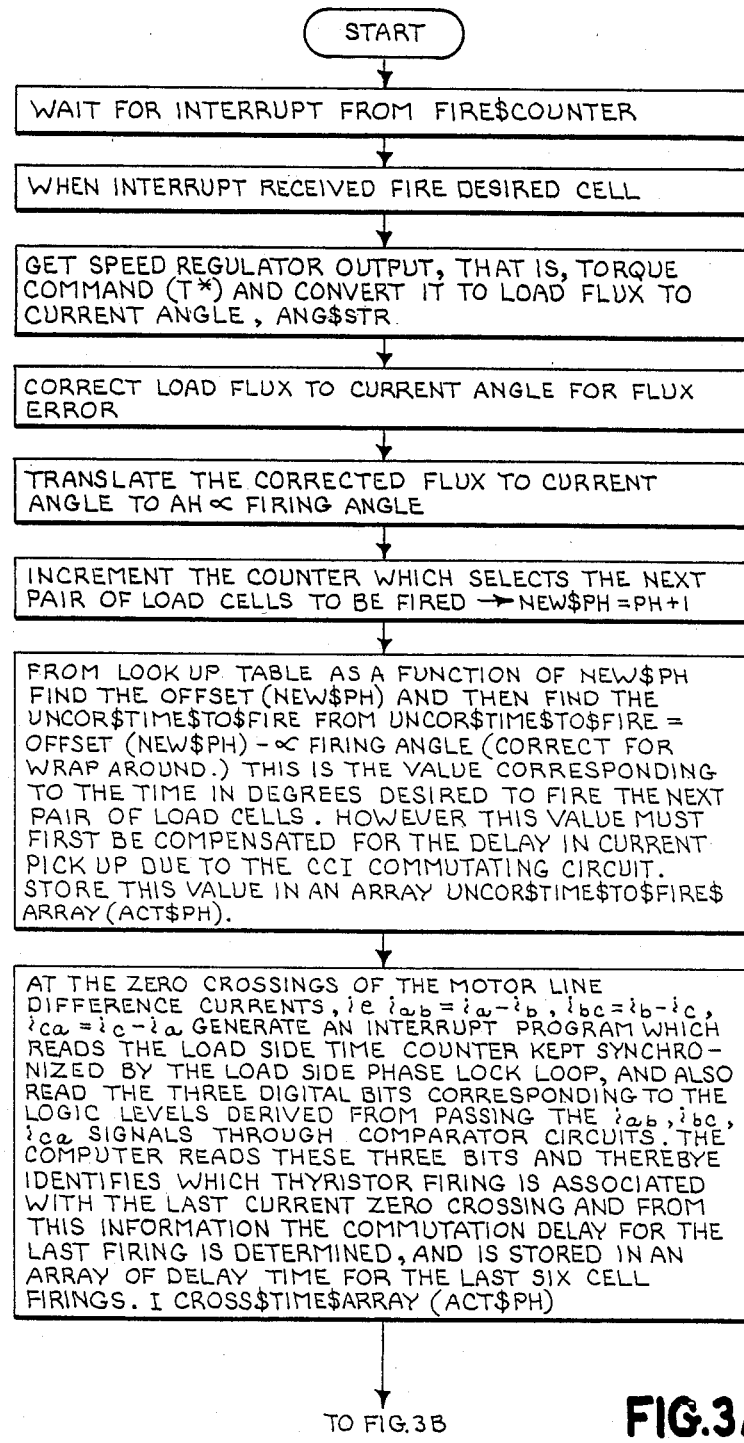

The software required for the embodiment illustrated in FIG. 2 is represented by the flow chart shown in FIG. 3. As shown, the routine for firing the inverter thyristors in accordance with the present invention begins by receiving an interrupt from the fire counter 106 when the fire counter is clocked down to zero. Next, the desired cell pair is fired. The output of the speed regulator (not shown) which is a torque command, is coupled to the A/D converter 115 and converted to a load flux to current angle. The angle between motor line current and phase flux is linearly related to the angle between motor phase voltage and line current, and thus also to the load converter firing angle alpha. For illustration, the difference between the phase flux of phase A shown in FIG. 4B and the phase A line current in FIG. 4A is 45°. The load flux to current angle is then corrected for flux error. The corrected flux to current angle is translated to an alpha ($\alpha$) firing angle. An $\alpha$ firing angle is defined as an angle measured with reference to a particular reference point, with a firing angle of zero corresponding to the condition when each thyristor in the circuit is fired at the instant its anode voltage first becomes positive in each cycle assuming no commutation circuit. Under this condition the converter (assuming no commutation circuit) operates in exactly the same manner as if it were an uncontrolled rectifier circuit. The $\alpha=0$ firing angle relative to the phase a voltage is shown in FIG. 4A. It will be remembered that just one phase of a three phase system is shown.

The relationship between firing angle alpha and the direction and amount of motor power is shown in FIG. 4I for cell one of a current controlled inverter supplying an induction motor and in FIG. 4H for cell one of a load commutated inverter supplying a synchronous motor. In the synchronous motor, maximum braking power is obtained at $\alpha=0°$, zero power at $\alpha=90°$, and maximum motoring power at $\alpha=180°$, while in the induction motor, maximum motoring power is obtained at $\alpha=180°$, zero power at $\alpha=270°$, and maximum braking power at $\alpha=360°$.

The counter which selects the next pair of load cells to be fired is incremented so that the variable NEW$PH equals PH+1. From a look-up table a variable OFFSET (NEW$PH) corresponding to the current value of the variable NEW$PH is determined and the variable UNCOR$TIME$TO$FIRE is determined from the difference between OFFSET (NEW$PH) and the $\alpha$ firing angle. The UNCOR$TIME$TO$FIRE is the time in degrees to fire the next pair of load side cells. Since the UNCOR$TIME$TO$FIRE has to be compensated for the delay in current pickup due to the CCI commutating circuit, this value is stored in an array UNCOR$TIME$TO$FIRE$ARRAY (ACT$PH).

Next, at the occurrence of the zero crossings of the motor line difference currents an interrupt program is generated which reads the load side time counter which is kept synchronized by the load side phase-locked loop, and also reads the 3 digital bits corresponding to the logic levels derived from passing the 3 difference currents through comparator circuits. The 3 bit segment numbers are read to identify which thyristor firing is associated with the last current zero crossing, and from this information the commutation delay for the last firing is determined and stored in an array of the delay time for the last six cell firings. ICROSS$TIME$ARRAY (ACT$PH). An alternative to using the zero crossings of the difference currents is to use the integral of the line current. As shown in FIG. 4E the zero crossing of the integral of the line current $i_b$ detects the pickup of the current in thyristor 1 and thyristor 4 (not shown). Similarly, the integral of the line current $i_a$ gives the zero crossing of cells 2 and 5. Using the difference currents gives the best dynamic response. Using the integrated line currents gives better filtering to guard against ambiguous zero crossings if the minimum current settings are not properly coordinated with the dc link reactor and current ripple causes discontinuous current operation. In the present embodiment, the difference currents were used after they were passed through a low pass filter.

The difference between the actual zero crossing and the intended zero crossing is determined by the ICROSS$TIME$ARRAY (ACT$ PH) less the UNCOR$TIME$TO$FIRE$ ARRAY (ACT$ PH) corrected for numeric wraparound and called DELTA$DELAY$ANGLE. The value of DELTA$DELAY$ANGLE is input through a gain 88 to a software integrator to obtain DELAY$ANG=DELAY$ANG+DELTA$DELAY$ANG. The value of the DELAY$ANG is clamped between zero and 120°. The commutation delay is illustrated in FIG. 4G where the cell 1 firing was initiated using a high frequency pulse train gating of 15 microseconds on 30 microseconds off, but current conduction in phase A was delayed. The cell firing pulse train in FIG. G is seen to have duration of 120°. The firing ranges shown in FIGS. 4H and I show the permissible uncorrected firing angle range for cell 1. As seen in FIG. 4I the cell firing can be initiated up to 120° before the permissible firing range, if necessary, to cause the current pick up to occur at $\alpha=180°$.

The TIME$TO$FIRE is calculated as TIME$TO$FIRE=UNCOR$TIME$TO$FIRE−DELAY$ANGLE. The TIME$TO$GO is then calculated as TIME$TO$GO$=TIME$TO$FIRE−TIME$COUNTER$READING. The TIME$TO$GO is the value in degrees to be loaded into a down counter, such that when the down counter clocks down to zero count, an interrupt is generated which calls for the next cell firing. The TIME$TO$GO is corrected for numeric wraparound since the allowable value of the time counter is zero to 512 counts.

If the TIME$TO$GO is negative, this means that it is already too late to fire and the next thyristor pair is fired immediately. If the TIME$TO$GO is too short to allow another regulator calculation, the fire counter is loaded with the TIME$TO$GO and the fire counter preset is loaded with the equivalent of 60° of count. By this means the next thyristor pair is fired after the TIME$TO$GO count in the fire counter is decremented to zero and then the 60° of count is then loaded into the fire counter such that if the next regulator calculation is not completed within 60° the time for firing the next thryistor pair defaults to 60° after the last firing.

If the TIME$TO$GO calculated above is long enough to run another regulator calculation, then the fire counter is loaded with some count NEXT$TIME, and the fire counter is loaded with TIME$TO$GO −− NEXT$TIME. By this means after NEXT$TIME decrements to zero, another regulator calculation is made to determine a new TIME$TO$GO. If however this new calculation is not ready, the time for firing the next thyristor pair defaults to TIME$TO$GO − NEXT$TIME. The routine then waits for another interrupt from the FIRE$COUNTER.

In order to more fully understand the operation of the microprocessor 102 as it relates to control of the load side inverter 3, the interrupt programs for this microprocessor will be briefly considered. Although some redundancy will result in view of the proceeding description, in their descending order of priority, the programs consist of: (1) the fire counter service program, (2) the difference current crossover service program, (3) the flux crossover service program, (4) the pulse train limit service program, (5) the phase-locked loop correction program, (6) the inverter control program, and (7) speed regulator program.

The fire counter service interrupt program is initiated every time the fire counter 106 times out. The fire counter service interrupt program sets up the next fire counter load output from the microprocessor for a count of 60° so that barring later information, the next fire counter service interrupt will occur at 60°. The fire counter service interrupt program then checks to see if the new cell firing is to occur during this pass through the program; if so, the cell firing algorithm is called. Then the fire counter service interrupt generates an interrupt to initiate the inverter control interrupt program which is of the next to lowest level of priority.

The second highest priority interrupt program is a difference current crossover service program which as previously noted is generated at every zero crossing of the difference currents to identify when current in the appropriate phase has picked up. To properly identify which current zero crossing has occurred, the polarity of all 3 phases of the difference currents is detected at the same time the zero crossing occurs, and from this information the proper identification can be made, even for commutation delays up to 120° which is the inherent maximum allowable delay in a controlled current inverter from a stability viewpoint.

The third highest priority interrupt program is the flux crossover interrupt which as previously noted is generated at every zero crossing of the reconstructed flux waves that occur six times per cycle of fundamental frequency and from which are generated the synchronizing signals for the software phase-locked loop shown in FIG. 2. The crossover interrupt program, moreover, reads the time counter 105 which is clocked from the phase-locked loop counter 104. As already indicated, the clock rate is 512 pulses per fundamental frequency period. Thus the fundamental frequency period is divided by 512 giving the time counter an angle resolution of 360° divided by 512, which is equal to 0.703° of fundamental frequency. The flux crossover program also reads the pulse train limit counter which started counting down from a count equivalent to 30°, when the zero crossing interrupt was generated. This enables a correction of the time counter reading by the amount of the time that the higher priority fire service interrupt program may have held off the flux crossover interrupt program. The flux crossover program then generates an interrupt calling for the phase-locked loop correction interrupt program. The flux crossover program next determines the angular error between the synchronizing crossover interrupt pulses outputted from the zero crossing detector 112 and the actual corrected time counter reading from counter 105.

Next the pulse train limit service program, which is fourth in priority, occurs when the pulse train limit counter 107 decrements to zero. A pulse train limit interrupt occurs 30° of fundamental frequency after a flux wave zero crossing. After this interrupt, the pulse train limit counter is reloaded with 30° of fundamental frequency count, but the counter doesn't initiate countdown until the occurrence of the next flux wave zero crossover.

The fifth highest priority interrupt program is the phase-locked loop correction interrupt program and is called once for each flux crossover interrupt program. A phase-locked loop correction interrupt program calculates the value of the divider ($\div$ N) phase-locked loop counter 104 to maintain synchronism between the pulse output of the counter and the zero crossing of the flux waves.

The load side inverter control interrupt program is the next to lowest in priority but contains the bulk of the mode determination, regulates thyristor firing angle determination functions and accordingly calls the appropriate algorithms. While the inverter control interrupt program is next to lowest in priority, it is called by the highest priority fire service interrupt program.

The lowest priority interrupt program is the speed regulator which is called by the inverter control interrupt program.

The phase-locked loop control for an induction motor hs been described in connection with a six pulse inverter. The control is easily modified for use with a 12 pulse control comprising two six pulse inverters by introducing a 30° shift in the firing commands developed for one six pulse inverter before applying them to the other.

The foregoing describes a control for an induction motor drive that directly controls the angle between motor flux and current simplifying the implementation without sacrificing performance. Further, a control for an induction motor drive has been described controlling motor current and the angle between motor flux and current wherein this angle is derived directly from a phase locked loop synchronized to integrated motor voltage.

While the invention has been particularly shown and described with reference to a preferred embodiment thereof, it will be understood by those skilled in the art that various changes in form and details may be made therein without departing from the spirit and scope of the invention.

What is claimed is:

1. A control for an induction motor drive comprising:
    a controlled current inverter having a plurality of controllable switches coupled to said induction motor and providing variable frequency, variable magnitude current to said motor;

means for providing an induction motor speed feedback signal;

comparator means responsive to a commanded speed signal and the speed feedback signal for providing a speed error signal;

means responsive to said speed error signal for determining an inverter firing angle signal;

means for integrating motor voltages to provide motor flux signals;

means for detecting the zero crossings of the motor flux signals to provide a pulse signal at a predetermined multiple of the fundamental motor frequency;

a phase-locked loop counter synchronized to said pulse signal, said phase-locked loop counter providing a predetermined number of counts per fundamental frequency period;

a down counter clocked by said phase-locked loop counter;

means responsive to said firing angle signal for loading said down counter with the time to go to fire the next controllable switch;

means for firing the next controllable switch when said down counter times out;

means for detecting the initiation of line current in said inverter;

means for determining the delay in the initiation of line current after the firing of said next controllable switch; and means responsive to the delay for compensating the time loaded into the down counter so as to fire a next controllable switch at an earlier time to achieve line current initiation at the time determined by said inverter firing angle signal.

2. The control of claim 1 wherein said means for determining the delay comprises means for integrating a signal representative of the difference between the time of initiation of line current and a signal representing said firing angle signal to generate an integrated signal and using the integrated signal to compensate the time to go loaded into the down counter.

3. The control of claim 1 wherein said means for detecting line current initiation in said inverter comprises means for determining difference currents of said induction motor and means for detecting the zero crossings of said difference currents, the conduction of said line currents corresponding to the zero crossings of said difference currents.

4. The control of claim 1 wherein said means for detecting line current initiation in said inverter comprises means for determining integrals of the line currents of said motor and means for detecting the zero crossings of said line current integrals, the initiation of said line currents corresponding to the zero crossings of said line current integrals.

5. The control of claim 1 wherein said controllable switches comprise thyristors.

6. The control of claim 1 wherein said means responsive to said speed error signal for determining an inverter firing angle signal is dependent on the desired angle between motor line current and phase flux, which is linearly related to the angle between motor phase voltage and line current.

7. A method for controlling an induction motor drive including a controlled current inverter having a plurality of controllable switches comprising the steps of:

comparing a commanded speed signal to a speed feedback signal to provide a speed error signal;

determining an inverter firing angle signal from the speed error signal;

integrating motor voltage signals to provide motor flux signals;

detecting the zero crossings of the motor flux signals to provide a pulse signal at a predetermined multiple of the fundamental motor frequency;

synchronizing a phase-locked loop counter to said pulse signal, said phase-locked loop counter providing a predetermined number of counts per fundamental frequency period;

clocking a down counter with said phase-locked loop counter;

loading said down counter with a time to go to fire the next controllable switch, responsive to said firing angle signal;

firing the next controllable switch when said down counter times out;

detecting line current initiation in said inverter;

determining the delay in line current initiation after the firing of said next controllable switch; and compensating the time to go loaded into the down counter so as to fire a next controllable switch at an earlier time to achieve line current initiation at the time determined by the inverter firing angle.

8. The method of claim 7 wherein the step of determining the delay in line current initiation comprises integrating a signal representing the difference between the time of initiation of line current and a signal representing said firing angle signal to generate an integrated signal and using the integrated signal to compensate the time to go loaded into the down counter.

9. The method of claim 7 wherein said step of detecting line current initiation in said inverter comprises the steps of determining induction motor difference currents and detecting the zero crossings of said difference currents, the initiation of said line current corresponding to zero crossings of said difference currents.

10. The method of claim 7 wherein said step of detecting line current initiation in said inverter comprises the steps of determining the integrals of the line currents of said motor and detecting zero crossings of said line current integrals, the initiation of said line currents corresponding to the zero crossings of said line current integrals.

11. The method of claim 7 wherein said step of determining an inverter firing angle signal is dependent on the desired angle between motor line current and phase flux, which is linearly related to the angle between motor phase voltage and line current.

* * * * *